(12) United States Patent
Tuong The

(10) Patent No.: US 11,220,031 B2
(45) Date of Patent: Jan. 11, 2022

(54) MOLD CONVEYANCE GUIDE APPARATUS IN INJECTION MOLDING MACHINE

(71) Applicant: Nichietsu Inc., Kanagawa (JP)

(72) Inventor: Hien Tuong The, Kanagawa (JP)

(73) Assignee: Nichietsu Inc., Kanagawa (JP)

( * ) Notice: Subject to any disclaimer, the term of this patent is extended or adjusted under 35 U.S.C. 154(b) by 613 days.

(21) Appl. No.: 16/215,004

(22) Filed: Dec. 10, 2018

(65) Prior Publication Data

US 2020/0039130 A1 Feb. 6, 2020

(30) Foreign Application Priority Data

Jul. 31, 2018 (JP) .............................. JP2018-144558

(51) Int. Cl.
| | |
|---|---|
| *B29C 45/33* | (2006.01) |
| *B29C 45/17* | (2006.01) |
| *B29C 45/04* | (2006.01) |
| *B29C 31/00* | (2006.01) |
| *B29C 33/30* | (2006.01) |
| *B29C 33/34* | (2006.01) |
| *B29C 45/26* | (2006.01) |

(52) U.S. Cl.
CPC ........ *B29C 45/1756* (2013.01); *B29C 31/006* (2013.01); *B29C 33/30* (2013.01); *B29C 33/305* (2013.01); *B29C 33/307* (2013.01); *B29C 33/34* (2013.01); *B29C 45/0408* (2013.01); *B29C 45/0416* (2013.01); *B29C 45/0433* (2013.01); *B29C 45/1742* (2013.01); *B29C 45/2673* (2013.01); *B29C 45/2675* (2013.01); *B29C 2045/2677* (2013.01)

(58) Field of Classification Search
CPC ............ B29C 45/1756; B29C 45/2673; B29C 45/2675; B29C 45/1742; B29C 45/0408; B29C 45/0416; B29C 45/0433; B29C 2045/2677; B29C 31/006; B29C 33/30; B29C 33/305; B29C 33/307; B29C 33/34
See application file for complete search history.

(56) References Cited

U.S. PATENT DOCUMENTS

| | | | | |
|---|---|---|---|---|
| 2,617,509 | A | * 11/1952 | Britton | ................... B21D 37/14 |
| | | | | 193/35 B |
| 4,345,893 | A | * 8/1982 | Prince | .................... B22D 17/10 |
| | | | | 425/595 |
| 4,861,254 | A | * 8/1989 | Takeuchi | ............ B29C 45/2673 |
| | | | | 425/190 |

(Continued)

FOREIGN PATENT DOCUMENTS

| | | |
|---|---|---|
| CN | 1753771 | 3/2006 |
| CN | 202439154 U | 9/2012 |

(Continued)

*Primary Examiner* — Timothy Kennedy
(74) *Attorney, Agent, or Firm* — Hamre, Schumann, Mueller & Larson, P.C.

(57) ABSTRACT

A mold conveyance guide apparatus includes: a linear guide that is attached along a conveyance direction of a mold to a mold attachment surface of at least one of a fixed platen or a movable platen to which the mold is fixed; a slider that is movably attached to the linear guide; and a coupling arm that is swingably attached to the slider in a direction coming closer to or separating from the mold attachment surface and is coupled to the mold in an engageable and disengageable manner.

20 Claims, 14 Drawing Sheets

(56) References Cited

U.S. PATENT DOCUMENTS

| | | | | | |
|---|---|---|---|---|---|
| 4,911,633 | A | * | 3/1990 | Comfort | B29C 48/355 |
| | | | | | 425/396 |
| 4,959,007 | A | * | 9/1990 | Okuyama | B29C 45/262 |
| | | | | | 249/59 |
| 5,350,289 | A | * | 9/1994 | Martin | B29C 31/006 |
| | | | | | 264/328.1 |
| 2003/0070784 | A1 | * | 4/2003 | Ikeda | B29C 45/0408 |
| | | | | | 164/137 |
| 2018/0009146 | A1 | * | 1/2018 | Nakamura | B29C 45/332 |

FOREIGN PATENT DOCUMENTS

| | | | | | |
|---|---|---|---|---|---|
| CN | 207044500 | U | | 2/2018 | |
| DE | 4219920 | A1 | * | 1/1993 | ......... B29C 45/1756 |
| JP | 54121919 | U | * | 8/1979 | ......... B29C 45/1756 |
| JP | 55-067428 | | | 5/1980 | |
| JP | 57160621 | A | * | 10/1982 | ......... B29C 45/1756 |
| JP | 9-066543 | | | 3/1997 | |
| JP | 2000-271994 | | | 10/2000 | |
| JP | 2002-192563 | | | 7/2002 | |
| JP | 2004-330748 | | | 11/2004 | |
| JP | 2013-095040 | | | 5/2013 | |
| JP | 2018-001738 | | | 1/2018 | |
| WO | 96/03266 | | | 2/1996 | |

* cited by examiner

MOLD CONVEYANCE GUIDE APPARATUS IN INJECTION MOLDING MACHINE

TECHNICAL FIELD

The present invention relates to a mold conveyance guide apparatus for use at the time of mold changing in an injection molding machine.

BACKGROUND ART

Due to subdivision of needs in recent years, there has been increasing demand for low-volume high-variety production by injection molding, and the frequency of change in a mold used in an injection molding machine tends to increase.

Since molds used in an injection molding machine are as heavy in weight as several tens of kilograms to dozens of tons, operations involved in the mold changing such as moving the mold and fixing the mold in place with high accuracy become a substantial burden on the operators.

In addition, during the movement operation of the mold, when the mold contacts the mold attachment surface of the injection molding machine, the friction of the contact may not only hamper the smooth positioning of the mold but also cause damage to the mold and the attachment surface.

For example, Patent Document 1 and Patent Document 2 disclose examples structures for reducing a burden on the operators and preventing damage to the mold and the attachment surface, and others.

CITATION LIST

Patent Document

Patent document 1: JP 9-66543 A
Patent document 2; JP 2018-001738 A

Patent Document 1 discloses a configuration in which a large number of rollers on which a mold is to be placed is fixed to the mold attachment surface of an injection molding machine. The mold can be smoothly conveyed by rotation of these rollers.

This configuration enables smooth conveyance of the mold between the mold change device and the injection molding machine, thereby solving the former problem described above.

Patent Document 2 discloses a configuration in which grooves are formed in a fixed platen and a movable platen with a mold attachment surface, and rollers and resilient members are fitted into the groove such that the rollers are movable between a position protruding from the mold attachment surface and a position retracting from the mold attachment surface and the resilient members elastically press the roller toward the protruding position.

The rollers are protruded from the mold attachment surfaces to separate the mold from the mold attachment surface during changing in a mold.

The rollers are also pressed by the mold and pushed into the mold attachment surface so that the mold is brought into abutment with the mold attachment surface when fixing the mold.

Accordingly, at the time of change in a mold, it is easy to convey and move the mold in the state separated from the mold attachment surface and it is possible to prevent damage to the mold and the mold attachment surface.

Further, when a mold is fixed, the rollers are moved backward so that the mold is evenly in contact with the mold attachment surface so as not to inhibit the fixation.

SUMMARY OF THE INVENTION

Problems to be Solved by the Invention

However, to attach the roller to an injection molding machine, it is necessary to form bolt holes or the like in the mold attachment surface of the molding machine. In particular, it is not easy to form these holes with accuracy in an already installed injection molding machine.

This generates a difference in height between the rollers so that the lower part of the mold may strongly contact the rollers during conveyance. For this reason, there are cases that the rollers break at an early stage.

Further, according to the conventional technique disclosed in Patent Document 2, it is necessary to form grooves in the fixed platen and the movable platen. These grooves need to have a sufficient volumetric capacity to attach the rollers and the resilient members in a manner capable of forward and backward movements.

However, to form grooves in an already installed injection molding machine, it is necessary to disassemble the molding machine. This would not only require high costs and much effort but also lengthen the period during the production is to be stopped.

In addition, the fixed platen and the movable platen need to receive clamping force generated by the molding machine, and thus forming grooves in the fixed platen and the movable platen in the existing molding machine causes a shortage of strength so that the generated clamping force may need to be decreased.

As a method for preventing decrease in the strength, plates are attached anew to the fixed platen and the movable platen to form grooves can be considered. Yet, according to this method, the distance between the fixed platen and the movable platen becomes short to decrease the maximum thickness of an attachable mold.

On the other hand, to manufacture a new injection molding machine, it is able to keep the maximum thickness of a mold by improving the strength with shape changes of the fixed platen and the movable platen. It can also be able to keep the maximum thickness by extending tie bars in case when the thickness of the fixed platen and the movable platen are increased. However, these measures cause cost increase.

In light of the problems with the conventional technique, an object of the present invention is to provide a mold conveyance guide apparatus that is installable in many injection molding machines with low cost and in an easy manner, poses no constraints on the strength of the molding machine and the dimensions of the mold, and implements high-accuracy mold conveyance.

Means for Solving the Problems

A mold conveyance guide apparatus in an injection molding machine of the present invention includes: a linear guide that is provided in the injection molding machine and attached along a conveyance direction of a mold to a mold attachment surface of at least one of a fixed platen or a movable platen to which the mold is fixed; a slider that is movably attached to the linear guide; and a coupling arm that is swingably attached to the slider in a direction coming closer to or separating from the mold attachment surface and is coupled to the mold in an engageable and disengageable manner.

In the mold conveyance guide apparatus in an injection molding machine of the present invention, the mold to be conveyed is disposed at side portions in a mold attachment space formed between the fixed platen and the movable platen.

Prior to the conveyance of the mold, the slider is moved to the end of the linear guide, and the coupling arm provided on the slider is coupled to the mold to be conveyed, thereby coupling the mold to the slider.

Thus, with the press of the mold, the mold can be moved and conveyed together with the slider.

When the mold is conveyed, the slider is moved along the linear guide and thus the mold to be conveyed is also moved along the linear guide.

In this case, the linear guide is fixed to a predetermined position in the fixed mold or the movable mold and is vertically positioned in a fixed manner.

Therefore, the mold to be conveyed is not moved vertically but moved in parallel.

The slider moves along the linear guide while bearing the weight of the mold to be conveyed. However, the portion of the linear guide guiding the movement of the slider has a smooth surface, which suppresses the occurrence of shock during the conveyance and allows the smooth movement of the slider.

As a result, it is possible to enhance the durability without having to increase the strength of the slider and the linear guide and suppress cost increase.

The bolt holes are formed in advance in the mold attachment surfaces of the fixed platen and the movable platen, and the linear guide is fixed in the bolt holes by fixation bolts.

Therefore, the position adjustment such as leveling becomes easy. Moreover, the mold conveyance guide apparatus can be installed by simple and minimum processing on the fixed platen and the movable platen, which prevents decrease in the strength of the fixed platen and the movable platen.

Further, swinging the coupling arm in the direction separating from the mold attachment surface of the fixed platen or the movable platen makes it possible to hold the mold separately from the mold attachment surface.

Therefore, it is possible to facilitate the conveyance of the mold while preventing the contact with the mold attachment surface during the conveyance of the mold, and prevent damage to the mold and the fixed platen or the movable platen.

The mold is connected to the fixed platen or the movable platen via the connection such as the coupling arm. Thus, in a horizontal injection molding machine in particular, even if the movable platen is opened with the mold not fixed to the attachment plate, the mold will not come off the molding machine with an excellent level of safety.

On the other hand, when the mold is fixed to the fixed platen or the movable platen, the coupling arm is swung by the fixing force toward the mold attachment surface, which allows the mold to be in even contact with the mold attachment surface and be fixed in a stable manner.

It is preferred to interpose the resilient member between the slider and the coupling arm to elastically press the coupling arm in the direction separating from the mold attachment surface.

According to this configuration, the mold can be automatically held at a position separated from the mold attachment surface by the resilient force of the resilient member. Therefore, it makes it possible to prevent contact between the mold and the fixed platen or the movable platen in a reliable manner.

In addition, at the fixation of the mold, the elasticity of the resilient member permits the movement of the mold toward the mold attachment surface to allow smooth and reliable fixation.

The resilient member can be replaced by an actuator that is driven by air pressure, oil pressure, or electricity.

By using such an actuator, the operation of the actuator can be stopped at the fixation of the mold to release the pressing force in the direction separating the mold from the mold attachment surface. Then, using the released pressing force, it is able to act all the fixing force applied to the mold on the mold.

The coupling arm can be made movable in the direction of a swing central line, and a resilient member can be provided between the coupling arm and the slider to press the coupling arm in the direction of the swing central line.

The resilient member may be provided to press the coupling arm downward or press the coupling arm upward. It is preferable to be configured to press the coupling arm to either side of the direction of a swing axial line.

According to this configuration, the resilient member can absorb vibration generated during the movement of the mold, which makes it possible to reduce a load on the linear guide and contribute to the longer service life of the linear guide.

In addition, applying a pre-load to the resilient member to generate a pressing force in advance, suppress the vibration of the mold during conveyance.

In a horizontal injection molding machine in particular, it is necessary to align the position of a nozzle touch portion of the mold with the position of an injection nozzle of the injection molding machine. Applying a pre-load to the resilient member is advantageous in keeping constant the position of the mold in the vertical direction regardless of the weight of the mold.

Two sliders can be attached to the linear slider.

According to this configuration, it is possible to arrange mold changing on the both sides of the injection molding machine so that they can be alternately used for mold changing.

In addition, pluralities of linear guides and sliders can be provided with vertical spacing therebetween.

Accordingly, it is possible to reduce a bearing load on the linear guides and the sliders and improve them in durability.

Furthermore, supporting the mold by the pluralities of linear guides and sliders makes it possible to reduce bending moment on the linear guides and the sliders and decrease the strength requirements of the linear guides and the sliders with cost reduction.

An actuator driven by air pressure, oil pressure, or electricity can be provided on a side portion of a mold attachment space formed between the fixed platen and the movable platen to carry the mold into and out of the mold attachment space.

According to this configuration, it is possible to eliminate the need for conveyance of the mold by man power and reduce a load on the person in charge of mold changing.

A portion of connection between the actuator and the mold preferably has a movable portion that separates the mold from the mold attachment surface and an elastic member that causes a force to act in a direction in which the connection portion of the mold is separated from the mold attachment surface.

Rollers supporting the mold in a manner capable of movement in the conveyance direction can be provided on the mold attachment surfaces of the fixed platen and the movable platen and at least one of the side portions of the mold attachment surfaces.

According to this configuration, the weight of the mold can be borne by the rollers in a shared manner to reduce the weight of the mold acting on the linear guide and the slider.

Advantageous Effects of Invention

The mold conveyance guide apparatus in the injection molding machine of the present invention minimizes the processing of the fixed platen and the movable platen to which the mold is attached, allows easy and low-cost installation in many injection molding machines, and implements long-time and high-accuracy mold conveyance without restrictions on the strength of the molding machine and the mold dimensions.

DESCRIPTION OF THE EMBODIMENTS

Figure 1:
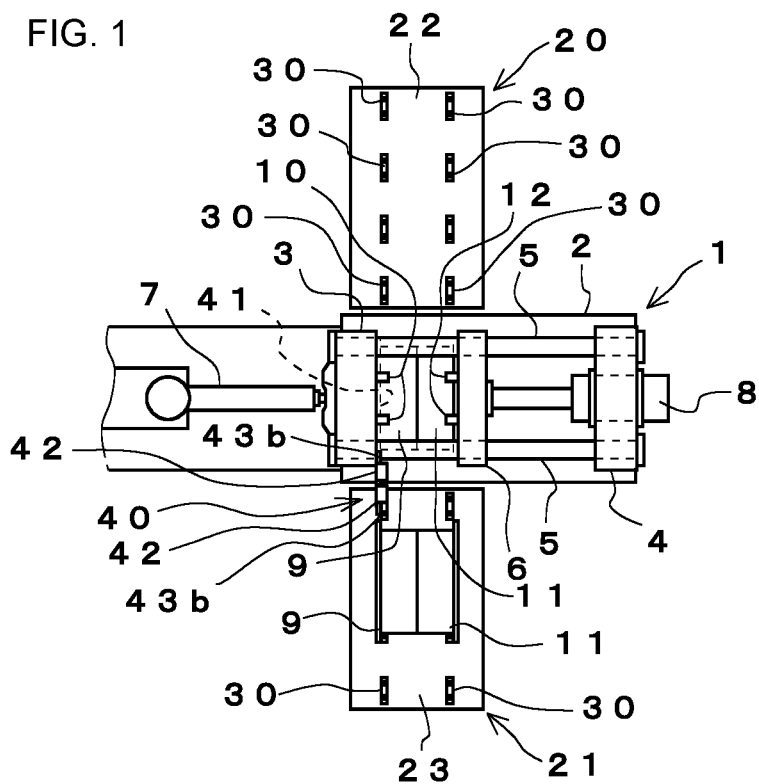
FIG. 1 is a plan view illustrating a procedure of mold changing in an injection molding machine to which a first embodiment of a mold conveyance guide apparatus of the present invention is applied.

A first embodiment of the present invention will be described with reference to the figures.

First, descriptions will be given as to a configuration of a horizontal injection molding machine including a mold change device to which the first embodiment of the present invention is applied, and a procedure for mold changing in the horizontal injection molding machine with reference to FIG. 1 through FIG. 8.

In these figures, reference sign 1 represents the horizontal injection molding machine.

The horizontal injection molding machine 1 includes: a base 2; a pair of parallel fixed platens 3 and 4 that is fixed and bonded to the base 2 with spacing therebetween; four tie bars 5 that are integrally installed between the fixed platens 3 and 4 (only the two tie bars arranged on the upper side are illustrated in the figures); a movable platen 6 that is slidably attached to the tie bars 5 between both the fixed platens 3 and 4 to form a mold fixation space between the movable platen 6 and the one fixed platen 3; an injection cylinder 7 that is provided on one fixed platen 3 side to inject a molding resin; and a clamping device 8 that is attached to the other fixed platen 4 to press the movable platen 6 toward the one fixed platen 3.

A fixed mold 9 is detachably fixed by clamps 10 to the surface of the one fixed platen 3 opposed to the movable platen 6 (mold attachment surface). A movable mold 11 is detachably fixed by clamps 12 to the surface of the movable platen 6 opposed to the one fixed platen 3 (mold attachment surface).

Mold change devices 20 and 21 are provided on both sides of the horizontal injection molding machine 1 at positions between the one fixed platen 3 and the movable platen 6 to replace the fixed mold 9 and the movable mold 11.

The mold change devices 20 and 21 include bases 22 and 23 almost orthogonal to the base 2 of the horizontal injection molding machine 1 and a large number of rollers 30 is arranged in two rows to support movably the fixed mold 9 and the movable mold 11 on the upper surfaces of the base stands 22 and 23.

These rollers 30 are also provided under the mold attachment surfaces of the one fixed platen 3 and the movable platen 6 if necessary.

A mold conveyance guide apparatus 40 in the present embodiment is attached to the mold attachment surface of the one fixed mold 9.

The mold conveyance guide apparatus 40 in the present embodiment includes, on the mold attachment surface of the one fixed platen 3, linear guides 41 that are fixed along a conveyance direction (horizontal direction in the present embodiment) of the fixed mold 9 and the movable mold 11 (hereinafter, simply called molds (9 and 11)) and sliders 42 movably attached to the linear guides 41, and coupling arms 43 that are swingably attached to the sliders 42 and are detachably coupled to the molds (9 and 11).

Figure 5:
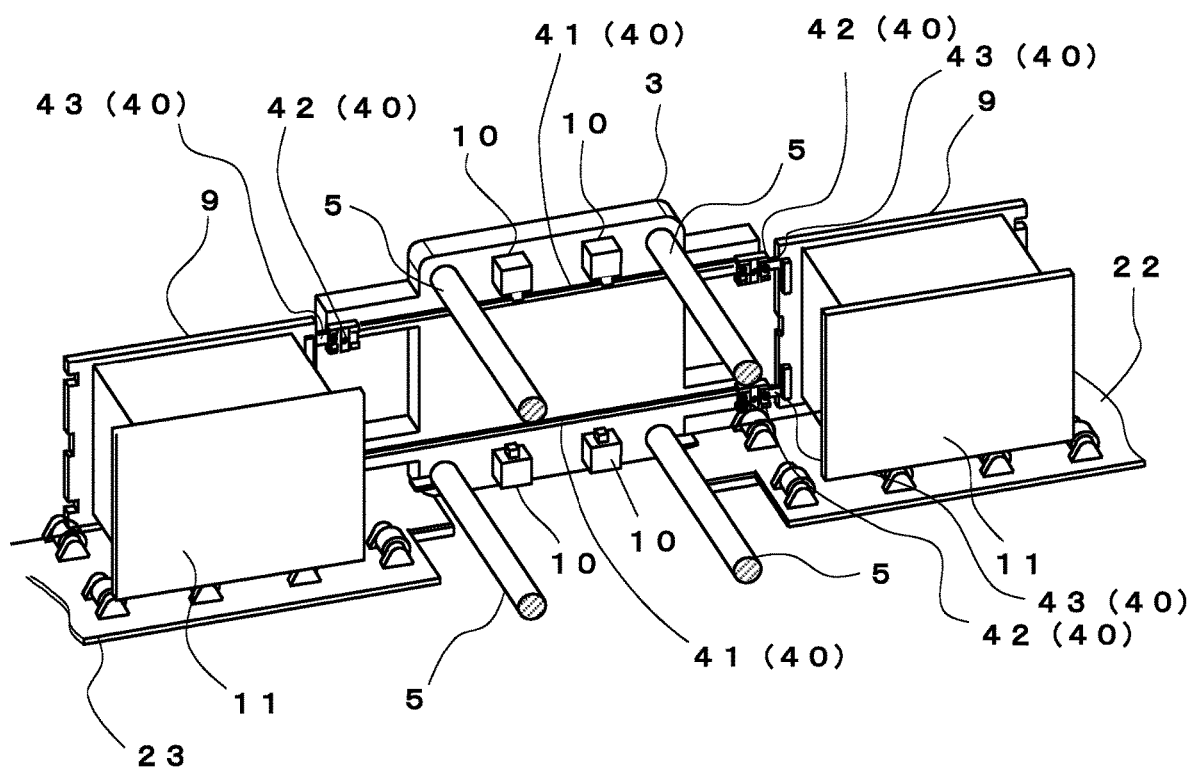
FIG. 5 is an enlarged perspective view of main components of the injection molding machine to which the first embodiment of the present invention is applied.

As illustrated in FIG. 5, the pair of linear guides 41 is arranged in parallel between the upper and lower clamps 10 on the mold attachment surface of the one fixed platen 3 and is fixed by bolts to bolt holes (not illustrated) in the mold attachment surface.

In this case, the linear guides 41 can be fixed only by forming the bolt holes in the fixed platen 3.

This makes it easy to apply the present embodiment to existent injection molding machines.

In general, the linear guides 41 are attached by a large number of small-diameter bolts, and it is comparatively easy to form the bolt holes with accuracy.

In addition, in general, the linear guides 41 are accurately manufactured, and thus the linear guides 41 can be fixed horizontally with accuracy only by tightening with the bolts while adjusting the tilt of the linear guides 41 in the horizontal state.

Further, the fixed platen 3 can be processed in a simple and easy manner to restrict the processing to the minimum extent, which makes it possible to decrease the processing cost and prevent degradation in the strength of the fixed platen 3.

In case when the fixed mold 9 is fixed, the linear guides 41 are stored in long grooves 9*b* in the fixed mold 9 along the entire width.

Accordingly, when the fixed mold 9 is fixed to the fixed platen 3, no interference occurs between the fixed mold 9 and the linear guides 41 so that the wide area of contact between the fixed mold 9 and the fixed platen 3 is ensured to apply a strong clamping force.

Figure 6:
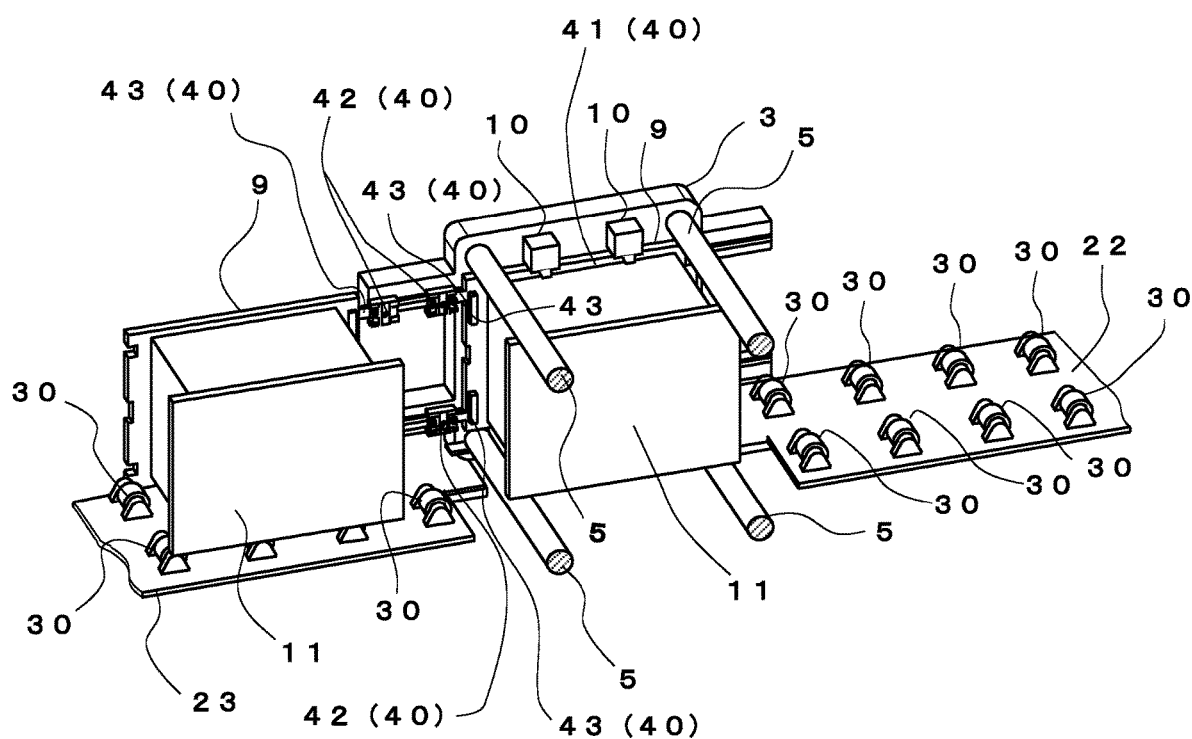
FIG. 6 is an enlarged perspective view of the main components of the injection molding machine to which the first embodiment of the present invention is applied.

The two sliders 42 are attached to each linear guide 41 as illustrated in FIG. 5 and FIG. 6.

Figure 7:
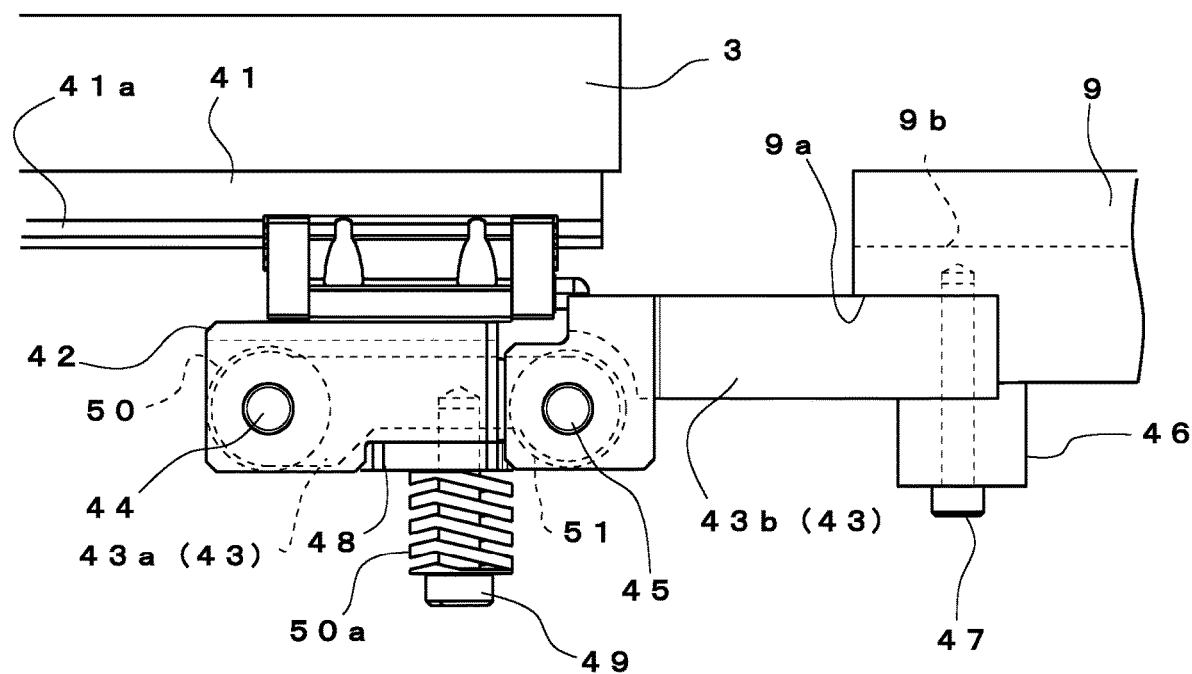
FIG. 7 is an enlarged plan view of the main components of the first embodiment of the present invention.
Figure 8:
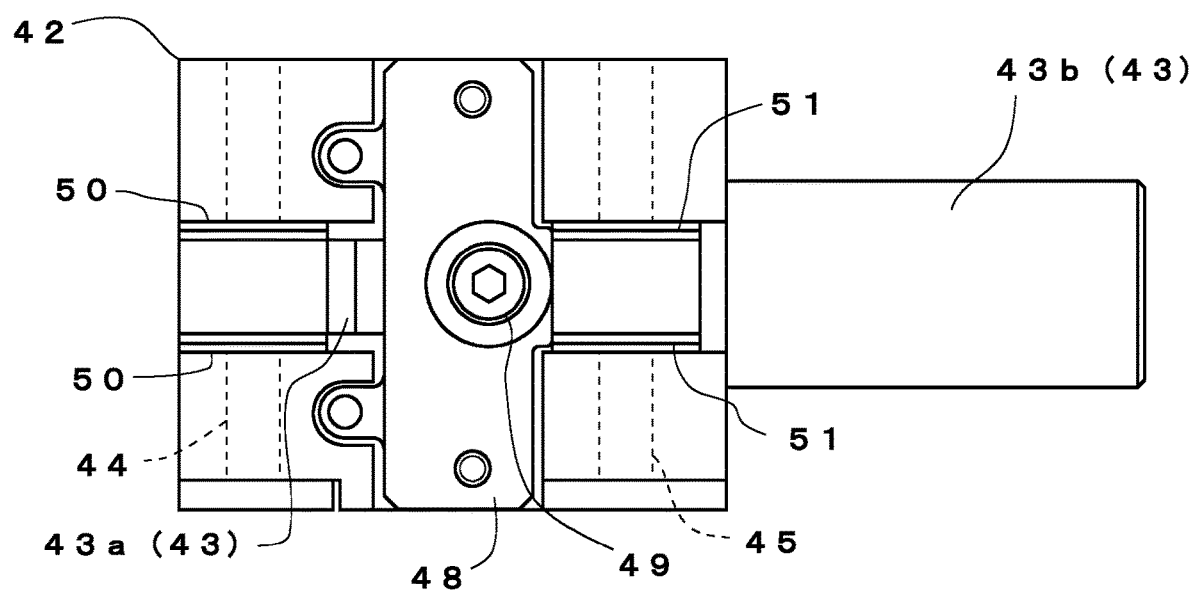
FIG. 8 is an enlarged front view of the main components of the first embodiment of the present invention.

As illustrated in FIG. 7, the sliders 42 are movably engaged with guide grooves 41*a* on both sides of the linear guides 41 via rolling bodies such as metal balls.

The coupling arms 43 attached to the sliders 42 include a first coupling arm 43*a* that has one end swingably coupled to a shaft 44 attached to the sliders 42 via a thrust bearing 50 and a second coupling arm 43*b* that has one end swingably coupled to a shaft 45 attached to an end of the first coupling arm 43*a* on the swinging side via a thrust bearing 51.

The second coupling arm 43*b* is provided to protrude from the slider 42 toward the fixed mold 9. The protrusion end of the second coupling arm 43*b* is inserted into a lock groove 9*a* at the side edge of the fixed mold 9 as illustrated in FIG. 7.

In addition, the protrusion end of the second coupling arm 43*b* inserted into the lock groove 9*a* is press-welded and fixed to the fixed mold 9 by a pressure fixing plate 46 arranged on the mold attachment surface side of the fixed mold 9.

The pressure fixing plate 46 is configured to press and fix the second coupling arm 43*b* by a fixing bolt 47 that penetrates through the pressure fixing plate 46 and the second coupling arm 43*b* and screwed into the fixed mold 9.

A lock plate 48 is attached to the side surface of the slider 42 in such a manner as to cross the swinging direction of the first coupling arm 43*a*.

A towing bolt 49 to be screwed into the first coupling arm 43*a* is loosely fitted into the lock plate 48. A compressed resilient member 50*a* is interposed between the head of the towing bolt 49 and the lock plate 48.

The compression of the resilient member 50*a* by the towing bolt 49 causes the first coupling arm 43*a* to be elastically towed in the direction separating from the mold attachment surface.

Next, a procedure for conveyance of a mold at the time of mold changing in the present embodiment will be described.

In this case, as illustrated in FIG. 1, the molds (9 and 11) are fixed to the fixed platen 3 and the movable platens 6 as the initial state.

In the initial state, as illustrated in FIG. 1, FIG. 6, and FIG. 7, the protrusion end of the second coupling arm 43*b* of one of the sliders 42 is fixed to the fixed mold 9 by the pressure fixing plate 46 and the fixing bolt 47.

In this state, the molds (9 and 11) are released from the clamping by the clamping device 8.

Then, the fixed mold 9 and the movable mold 11 are released from the clamps 10 and the clamps 12.

The order of the release is arbitrary and the molds may be released at the same time.

Figure 2:
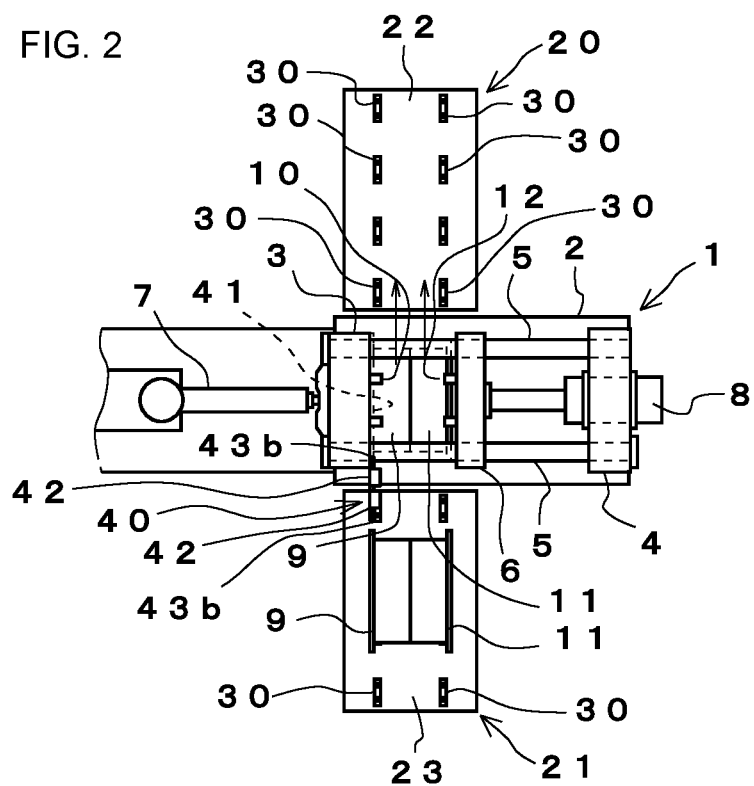
FIG. 2 is a plan view illustrating the procedure of mold changing in the injection molding machine to which the first embodiment of the mold conveyance guide apparatus of the present invention is applied.

Accordingly, the molds (9 and 11) are moved together with the sliders 42 toward the one mold change device 20 and conveyed onto the plurality of rollers 30 on the base 22 of the mold change device 20 as illustrated by arrows in FIG. 2.

During this mold conveyance, the weights of the molds (9 and 11) are at least partially borne by the one fixed platen 3 via the sliders 42 and the linear guides 41.

The movement of the molds (9 and 11) described above is performed by the sliders 42 linearly moving along the linear guides 41.

Therefore, during the movement of the molds (9 and 11), the upward and downward motion of these molds is suppressed.

The sliders 42 are linearly moved along the smooth guide grooves 41*a* in the linear guides 41, which causes no impact during the movement of the sliders 42 and allows smooth movement.

As a result, it is possible to prevent the sliders 42 and the linear guides 41 from becoming damaged and achieve the longer service life of these components.

In addition, there is no need to enhance the strengths of the sliders 42 and the linear guides 41 in case of damage, which achieves cost reduction.

On the other hand, in the present embodiment (the first embodiment), when the molds (9 and 11) are released from the clamps 10 and 12 and the movable platen 6 is slightly opened for the conveyance of the molds (9 and 11), the first coupling arm 43*a* is swung by the resilient member 50*a* in the direction separating from the mold attachment surface.

Along with this, the fixed mold 9 is separated together with the second coupling arm 43*b* from the fixed platen 3, and the molds (9 and 11) are conveyed in the separated state.

As a result, it is possible to keep the fixed mold 9 and the fixed platen 3 from contacting with each other and prevent damage to these components and facilitate the conveyance of the molds (9 and 11).

In addition, in the present embodiment, the two mold conveyance guide apparatus 40 are provided with vertical spacing therebetween to support the fixed mold 9 at the upper and lower sides.

Accordingly, the two mold conveyance guide apparatus 40 bear the weights of the molds (9 and 11) to reduce a load on each of the mold conveyance guide apparatus 40 as well as preventing the action of moment on the components of the mold conveyance guide apparatus 40.

As a result, the mold conveyance guide apparatus 40 can be decreased in size and weight to achieve cost reduction.

Upon completion of conveyance of the molds (9 and 11) fixed in the initial state described above, the molds (9 and 11) held on standby in another mold change device 21 are carried in.

Figure 3:
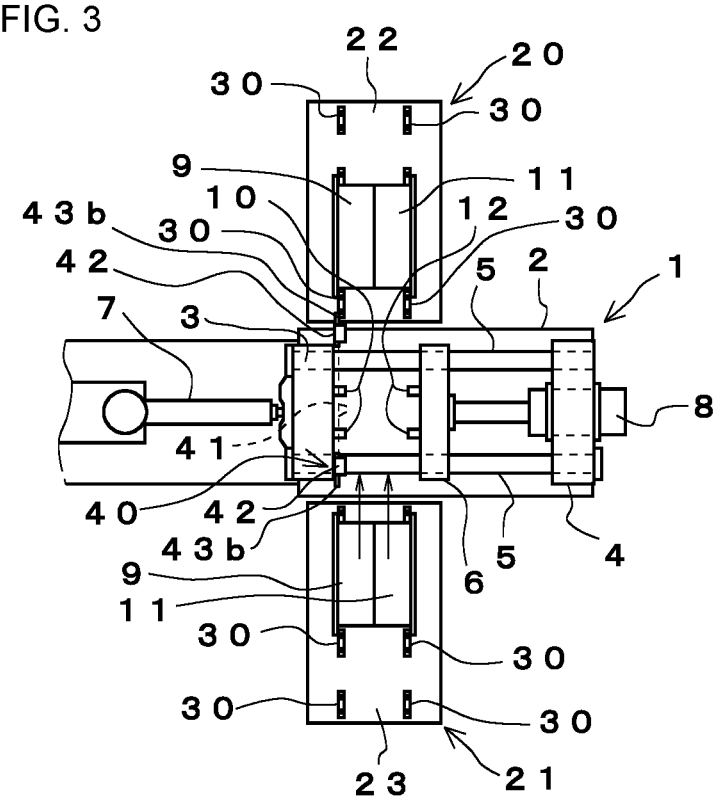
FIG. 3 is a plan view illustrating a procedure of mold changing in the injection molding machine to which the first embodiment of the mold conveyance guide apparatus of the present invention is applied.
Figure 4:
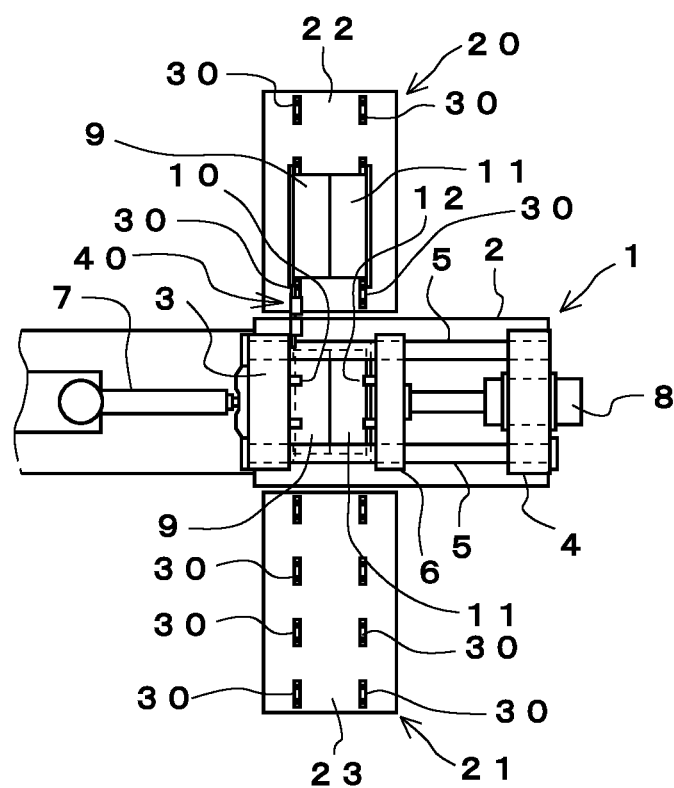
FIG. 4 is a plan view illustrating a procedure of mold changing in the injection molding machine to which the first embodiment of the mold conveyance guide apparatus of the present invention is applied.

To carry in the molds, first, the molds (9 and 11) held on standby in the other mold change device 21 are moved toward the horizontal injection molding machine 1, and then the fixed mold 9 is coupled to the second coupling arm 43*b* of the other slider 42 attached to the linear guide 41 as illustrated by arrows in FIG. 3.

The fixed mold 9 and the second coupling arm 43*b* may be coupled while the fixed mold 9 is held on standby to shorten the time taken for the mold changing.

To couple the fixed mold 9 to the second coupling arm 43*b*, the second coupling arm 43*b* is pressed together with the first coupling arm 43*a* by the resilient member 50*a*.

At the time of coupling, the action of the resilient member 50a restrains unnecessary motion of the second coupling arm 43b to facilitate the coupling.

Accordingly, the molds (9 and 11) to be carried in are moved together with the sliders 42 toward the injection molding machine 1. The positions of the molds (9 and 11) are aligned with the mold fixing positions in the fixed platen 3 and the movable platen 6.

After the positions fixed, sandwiches the molds (9 and 11) between the fixed platen 3 and the movable platen 6 by the clamping device 8. Then the molds (9 and 11) are fixed by the clamps 10 and 12 to the fixed platen 3 and the movable platen 6. Accordingly, the introduction of the molds (9 and 11) is completed.

During the introduction of the molds (9 and 11) described above, the fixed mold 9 is smoothly moved in the state separated from the fixed platen 3 by the action of the resilient member 50a.

The clearance between the molds (9 and 11) and the fixed mold 9 acts against the resilient force of the resilient member 50a and is removed by swinging the second coupling arm 43b toward the fixed platen 3 by the molds (9 and 11) that are sandwiched between the fixed platen 3 and the movable platen 6.

As described above, according to the mold conveyance guide apparatus 40 in the present embodiment, it is possible to, during the discharge and introduction of the molds (9 and 11), prevent the occurrence of impulsive force at the movable portions of the molds. Therefore, it is able to improve the durability of the molds.

At the change in the molds (9 and 11) described above, the discharge of one of the molds (9 and 11) and the introduction of the other of the molds (9 and 11) can be performed at the same time.

The linear guides 41 as components of the mold conveyance guide apparatus 40 can be fixed to the fixed platen 3 by using bolts or the like.

Therefore, the fixed platen 3 can be simply processed to form the bolt holes in the mold attachment surface, which minimizes the shape change of the fixed platen 3 due to the processing and suppresses decrease in the strength of the fixed platen 3.

In addition, the fixed platen 3 can be simply processed by forming the bolt holes as described above to fix the mold conveyance guide apparatus 40. Thus for example, eliminates the need for a large-scale operation such as removing the fixed platen 3 from the tie bars 5. Accordingly, the mold conveyance guide apparatus 40 can be easily applied to existing injection molding machines.

By the synergetic effect of these operations, it is possible to reduce the cost necessary for the attachment of the mold conveyance guide apparatus 40.

In addition, the fixed mold 9 is moved in the state separated from the fixed platen 3 at the time of introduction and discharge, which prevents these components from becoming damaged. Further, it makes the movement of the molds (9 and 11) smooth to reduce a load on the operator during the discharging and introducing operations.

Instead of the resilient member 50a, an actuator driven by air pressure, oil pressure, or electricity can be used.

By using such an actuator, the operation of the actuator can be stopped at the fixation of the molds (9 and 11) to release the pressing force in the direction separating the mold from the mold attachment surface, and effectively act all the fixing force applied to the mold on the mold.

Figure 9:
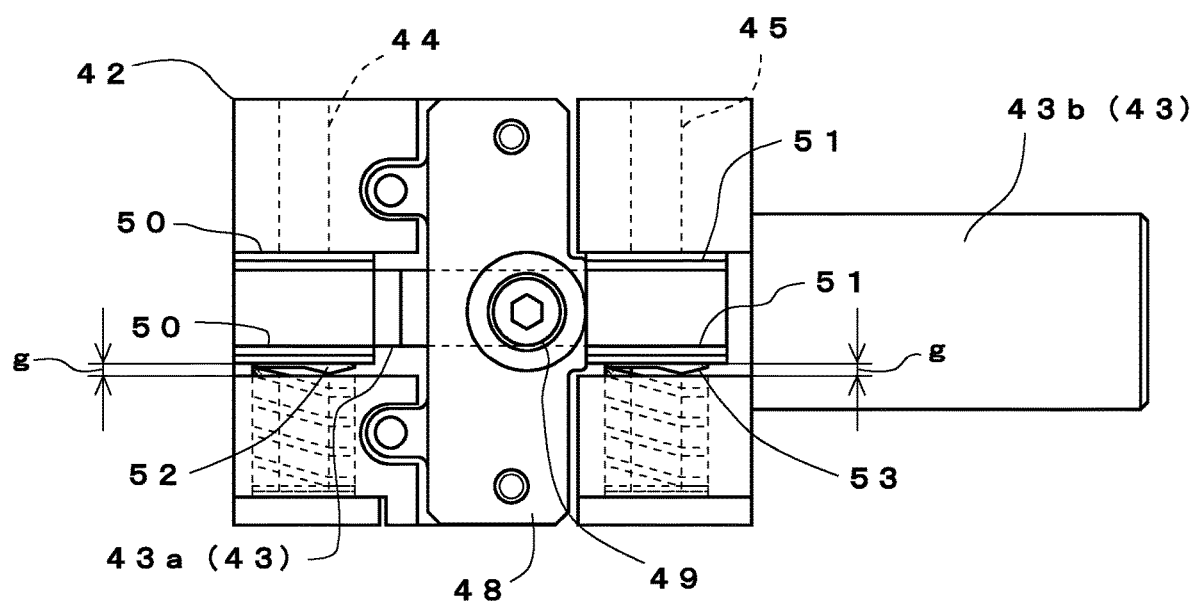
FIG. 9 is a front view of a second embodiment of the present invention.

FIG. 9 illustrates a second embodiment of the present invention.

In the present embodiment, the coupling arms 43 are vertically movable along the swing central line, and resilient members are interposed between the coupling arms 43 and the sliders 42 to pressurize the coupling arms 43 upward in the direction of the swing central line.

In the illustrated example, a resilient member 52 is interposed between the lower part of the first coupling arm 43a and the slider 42, and a resilient member 53 is interposed between the lower part of the first coupling arm 43a and the second coupling arm 43b.

In addition, it is preferred to apply a pre-load to the resilient members 52 and 53 so that the resilient members 52 and 53 can generate pressing force in advance.

In a state without the action of external force, the coupling arms 43 are positioned such that the first coupling arm 43a is pressed upward and brought into abutment with the upper inner wall of the slider 42 by the pre-load, and the second coupling arm 43b is pressed downward and brought into abutment with the upper surface of the first coupling arm 43a by the pre-load.

As described above, in the positioned state, a gap g is formed between the lower part of the first coupling arm 43a and the slider 42 and between the lower part of the first coupling arm 43a and the second coupling arm 43b.

This configuration is made because vibration may occur due to acceleration or deceleration of the molds to be conveyed.

Figure 10:
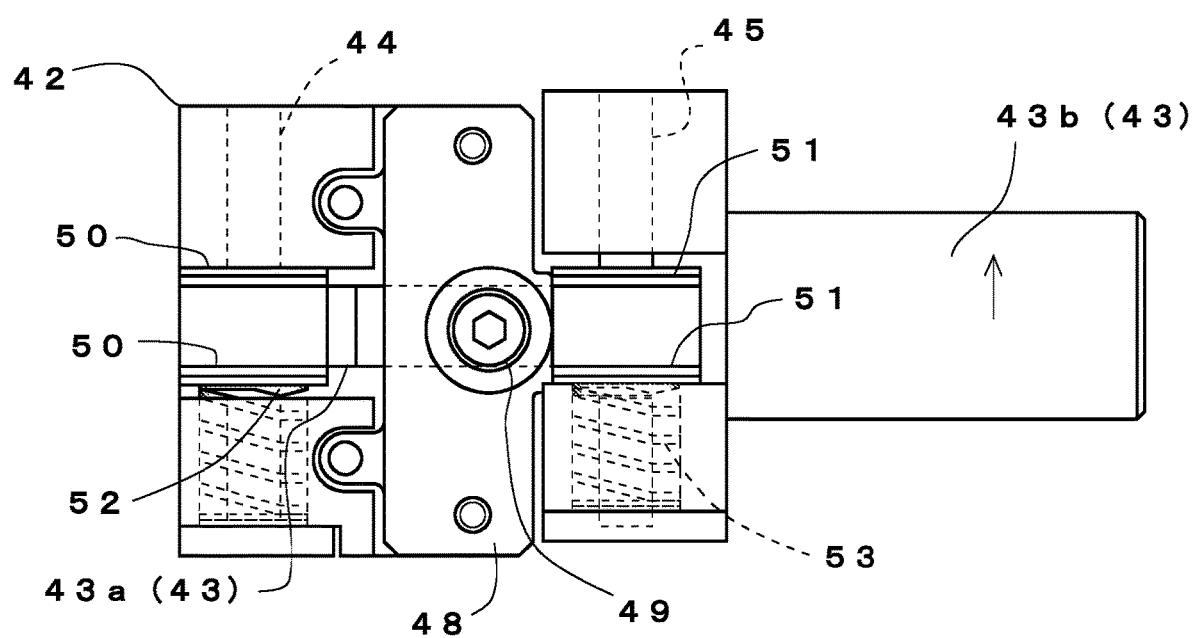
FIG. 10 is a front view of coupling arms in the second embodiment of the present invention for describing displacement of the coupling arms.

Specifically, as illustrated by an arrow in FIG. 10, when upward force is applied to the second coupling arm 43b, the abutment of the first coupling arm 43a with the slider 42 restricts the upward movement of the first coupling arm 43a, and thus the second coupling arm 43b elastically deforms and contracts the resilient member 53 and is displaced upward.

At this time, the upward displacement is suppressed by the pre-load applied to the resilient member 53 to suppress the vibration of the upwardly moving second coupling arm 43b.

Figure 11:
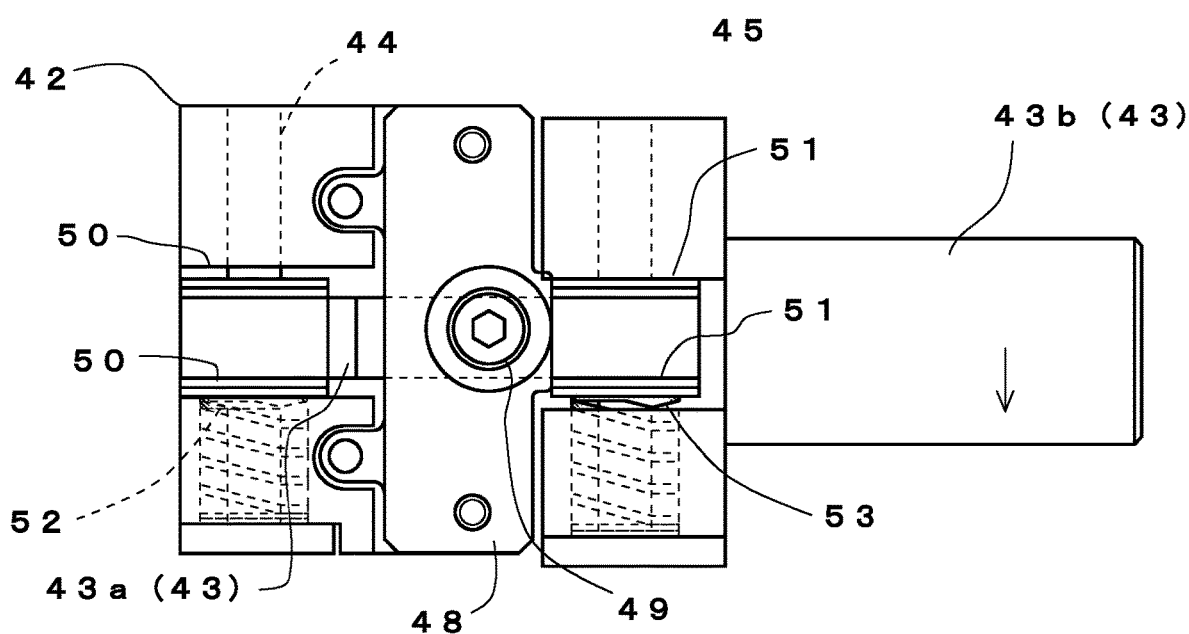
FIG. 11 is a front view of the coupling arms in the second embodiment of the present invention for describing displacement of the coupling arms.

On the other hand, as illustrated by an arrow in FIG. 11, when downward force is applied to the second coupling arm 43b, the second coupling arm 43b and the first coupling arm 43a elastically deform and contract the resilient member 52 and are displaced downward in an integrated manner.

At this time, the downward displacement is suppressed by the pre-load applied to the resilient member 53 to suppress the vibration of the downwardly moving second coupling arm 43b.

As described above, in the present embodiment, the two resilient members 52 and 53 under the pre-load are provided to hold the molds in a constant position during conveyance and halt, and permit vibration of the molds given a great impact and reduce a load on the mold conveyance guide apparatus 40.

In a horizontal injection molding machine in particular, it is necessary to align the position of a nozzle touch portion of the mold with the position of an injection nozzle of the injection molding machine. Applying a pre-load to the resilient member is advantageous in keeping constant the position of the mold in the vertical direction regardless of the weight of the mold.

Figure 12:
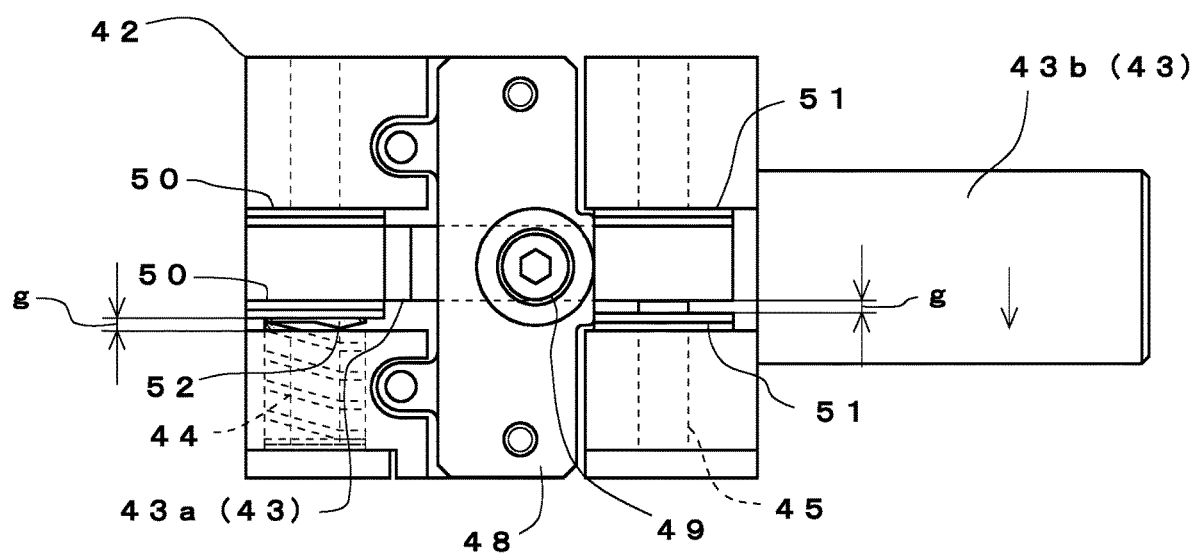
FIG. 12 is a front view of a third embodiment of the present invention.
Figure 13:
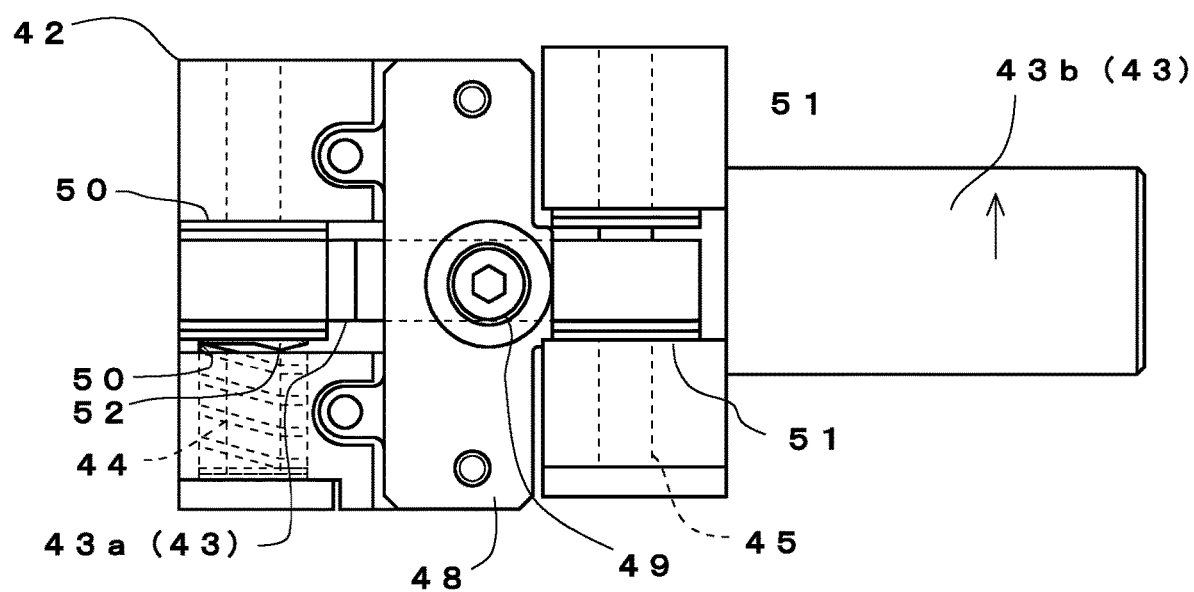
FIG. 13 is a front view of coupling arms in the third embodiment of the present invention for describing displacement of the coupling arms.
Figure 14:
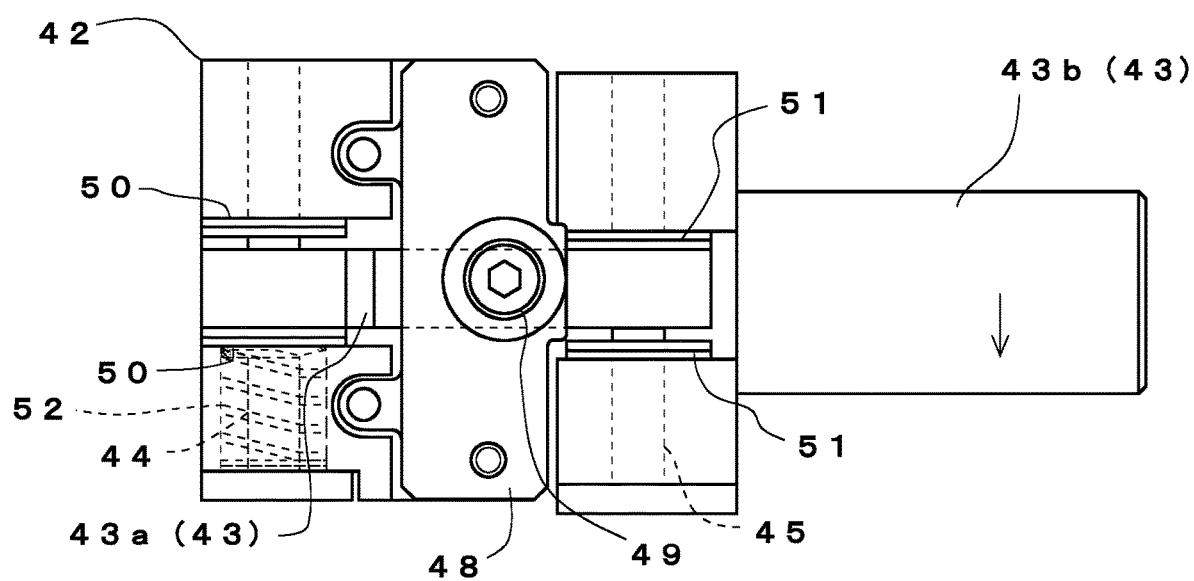
FIG. 14 is a front view of the coupling arms in the third embodiment of the present invention for describing displacement of the coupling arms.

FIG. 12 to FIG. 14 illustrate a third embodiment in which the resilient member 52 in the second embodiment is singly provided.

In this case, the first coupling arm 43a is positioned by being pressed upward and brought into abutment with the upper inner wall of the slider 42 by the pre-load on the resilient member 52.

The second coupling arm 43b is positioned by abutment with the upper surface of the first coupling arm 43a under its own weight to form the gap g under the first coupling arm 43a.

In this case, as illustrated by an arrow in FIG. 13, when upward force is applied to the second coupling arm 43b, the second coupling arm 43b is displaced upward due to the gap g.

On the other hand, as illustrated in FIG. 14, when downward force is applied to the second coupling arm 43b, the second coupling arm 43b and the first coupling arm 43a elastically deform and contract the resilient member 52 and are displaced downward in an integrated manner Accordingly, the downward displacement is suppressed by the pre-load applied to the resilient member 52 to suppress the vibration of the coupling arm 43.

The shapes, dimensions, or configurations of the components in the foregoing embodiments are mere examples and can be modified in various manners based on the design requirements and others.

For example, an actuator driven by air pressure, oil pressure, or electricity can be provided on a side portion of a mold attachment space formed between the fixed platen 3 and the movable platen 6 to carry the molds (9 and 11) into and out of the mold attachment space.

According to this configuration, it is possible to eliminate the need for conveyance of the mold by man power and reduce a load on the person in charge of mold changing.

In the foregoing examples, the mold conveyance guide apparatus 40 are provided in two rows. Alternatively, the mold conveyance guide apparatus 40 may be provided in three or more rows.

According to this configuration, it is possible to reduce a bearing load the weights of the molds on each of the mold conveyance guide apparatus 40 and achieve longer service life of the mold conveyance guide apparatus 40.

Further, the mold conveyance guide apparatus 40 can be attached to the movable platen 6 or the mold conveyance guide apparatus 40 can be provided on both the fixed platen 3 and the movable platen 6.

However, installing the mold conveyance guide apparatus 40 on only the fixed platen 3 is more advantageous in that, when one of the molds (9 and 11) in the injection molding machine is opened or closed, the other of the molds (9 and 11) on the mold change device is not moved.

REFERENCE SIGNS LIST

1 horizontal injection molding machine
2, 22, 23 base
3, 4 fixed platen
5 tie bar
6 movable platen
7 injection cylinder
8 clamping device
9 fixed mold
10, 12 clamp
11 movable mold
20, 21 mold change device
30 roller
40 mold conveyance guide apparatus
41 linear guide
41a guide groove
42 slider
43 coupling arm
43a first coupling arm
43b second coupling arm
44, 45 shaft
46 pressure fixing plate
47 fixing bolt
48 lock plat
49 towing bolt
50, 51 thrust bearing
50a, 52, 53 resilient member

The invention claimed is:

1. A mold conveyance guide apparatus used for mold changing in an injection molding machine, comprising:
   a linear guide that is provided in the injection molding machine and attached along a conveyance direction of a mold to a mold attachment surface of at least one of a fixed platen or a movable platen to which the mold is fixed;
   a slider that is movably attached to the linear guide; and
   a coupling arm that is swingably attached to the slider in a direction coming closer to or separating from the mold attachment surface and is coupled to the mold in an engageable and disengageable manner.

2. The mold conveyance guide apparatus in the injection molding machine according to claim 1, wherein a resilient member is interposed between the slider and the coupling arm to elastically press the coupling arm in the direction separating from the mold attachment surface.

3. The mold conveyance guide apparatus in the injection molding machine according to claim 1, wherein the coupling arm is connected to an actuator that performs a swinging action and is driven by air pressure, oil pressure, or electricity.

4. The mold conveyance guide apparatus in the injection molding machine according to claim 1, wherein the coupling arm is provided in a manner capable of moving in a direction of a swing central line and a resilient member is provided between the coupling arm and the slider to press the coupling arm in the direction of the swing central line.

5. The mold conveyance guide apparatus in the injection molding machine according to claim 2, wherein the coupling arm is provided in a manner capable of moving in a direction of a swing central line and a resilient member is provided between the coupling arm and the slider to press the coupling arm in the direction of the swing central line.

6. The mold conveyance guide apparatus in the injection molding machine according to claim 3, wherein the coupling arm is provided in a manner capable of moving in a direction of a swing central line and a resilient member is provided between the coupling arm and the slider to press the coupling arm in the direction of the swing central line.

7. The mold conveyance guide apparatus in the injection molding machine according to claim 1, wherein two sliders are attached to the linear guide.

8. The mold conveyance guide apparatus in the injection molding machine according to claim 2, wherein two sliders are attached to the linear guide.

9. The mold conveyance guide apparatus in the injection molding machine according to claim 3, wherein two sliders are attached to the linear guide.

10. The mold conveyance guide apparatus in the injection molding machine according to claim 4, wherein two sliders are attached to the linear guide.

11. The mold conveyance guide apparatus in the injection molding machine according to claim 1, wherein pluralities of the linear guides and the sliders are provided at intervals in a direction orthogonal to a conveyance direction of the mold.

12. The mold conveyance guide apparatus in the injection molding machine according to claim 2, wherein pluralities of the linear guides and the sliders are provided at intervals in a direction orthogonal to a conveyance direction of the mold.

13. The mold conveyance guide apparatus in the injection molding machine according to claim 3, wherein pluralities of the linear guides and the sliders are provided at intervals in a direction orthogonal to a conveyance direction of the mold.

14. The mold conveyance guide apparatus in the injection molding machine according to claim 4, wherein pluralities of the linear guides and the sliders are provided at intervals in a direction orthogonal to a conveyance direction of the mold.

15. The mold conveyance guide apparatus in an injection molding machine according to claim 1, wherein the actuator driven by air pressure, oil pressure, or electricity is provided on a side portion of a mold attachment space formed between the fixed platen and the movable platen to carry the mold into and out of the mold attachment space.

16. The mold conveyance guide apparatus in an injection molding machine according to claim 2, wherein the actuator driven by air pressure, oil pressure, or electricity is provided on a side portion of a mold attachment space formed between the fixed platen and the movable platen to carry the mold into and out of the mold attachment space.

17. The mold conveyance guide apparatus in an injection molding machine according to claim 3, wherein the actuator driven by air pressure, oil pressure, or electricity is provided on a side portion of a mold attachment space formed between the fixed platen and the movable platen to carry the mold into and out of the mold attachment space.

18. The mold conveyance guide apparatus in an injection molding machine according to claim 1, wherein a roller is provided on the mold attachment surfaces of the fixed platen and the movable platen and at least one of side portions of the mold attachment surfaces to support the mold in a manner capable of moving in the conveyance direction.

19. The mold conveyance guide apparatus in an injection molding machine according to claim 2, wherein a roller is provided on the mold attachment surfaces of the fixed platen and the movable platen and at least one of side portions of the mold attachment surfaces to support the mold in a manner capable of moving in the conveyance direction.

20. The mold conveyance guide apparatus in an injection molding machine according to claim 3, wherein a roller is provided on the mold attachment surfaces of the fixed platen and the movable platen and at least one of side portions of the mold attachment surfaces to support the mold in a manner capable of moving in the conveyance direction.

\* \* \* \* \*